(12) United States Patent
Jørgensen

(10) Patent No.: US 8,664,858 B2
(45) Date of Patent: Mar. 4, 2014

(54) LIGHT FIXTURE WITH AN ELECTRODELESS PLASMA SOURCE

(75) Inventor: Dennis Thykjaer Jørgensen, Roende (DK)

(73) Assignee: Martin Professional A/S, Aarhus N (DK)

( * ) Notice: Subject to any disclaimer, the term of this patent is extended or adjusted under 35 U.S.C. 154(b) by 284 days.

(21) Appl. No.: 13/060,922

(22) PCT Filed: Sep. 4, 2009

(86) PCT No.: PCT/DK2009/050227
§ 371 (c)(1),
(2), (4) Date: Feb. 25, 2011

(87) PCT Pub. No.: WO2010/025738
PCT Pub. Date: Mar. 11, 2010

(65) Prior Publication Data
US 2011/0181193 A1    Jul. 28, 2011

(30) Foreign Application Priority Data
Sep. 5, 2008 (DK) .................................. 2008 01246

(51) Int. Cl.
*H01J 65/04* (2006.01)
(52) U.S. Cl.
USPC .............................. 315/39; 315/248; 315/326
(58) Field of Classification Search
USPC ............. 315/39, 117, 248, 326, 344; 362/294
See application file for complete search history.

(56) References Cited

U.S. PATENT DOCUMENTS

| 4,978,891 | A | * | 12/1990 | Ury ................................ 315/117 |
| 5,798,611 | A | | 8/1998 | Dolan et al. |
| 5,803,566 | A | * | 9/1998 | Ogino .............................. 353/60 |
| 5,882,108 | A | * | 3/1999 | Fraizer .......................... 362/293 |
| 5,910,710 | A | * | 6/1999 | Simpson ........................ 315/248 |
| 5,977,724 | A | * | 11/1999 | Dolan et al. .................. 315/248 |
| 6,737,809 | B2 | | 5/2004 | Espiau et al. |

(Continued)

FOREIGN PATENT DOCUMENTS

| CN | 2390094 Y | 8/2000 |
| CN | 1411030 A | 4/2003 |

(Continued)

OTHER PUBLICATIONS

TIR Lens Guide, Ledil, OY, Salorankatu 10, FL-24240 Salo, Finland.

(Continued)

*Primary Examiner* — Tung X Le
(74) *Attorney, Agent, or Firm* — Roberts Mlotkowski Safran & Cole, P.C.; David S. Safran

(57) ABSTRACT

The present invention relates to a light fixture comprising an electrodeless plasma source, said electrodeless plasma source comprises a resonator and a light bulb, said light bulb is operating inside a cavity of a TIR where the TIR lens comprises a metal grid covering at least a part of said TIR lens, the metal grid grounding electromagnetic radiation generated by said electrodeless plasma source. In another embodiment, the light fixture comprises blowing means sending an air stream into the cavity. A further embodiment also comprises at least one LED, which ELPS bulb and the LED are controlled by a control system, which control system performs dimmer control of at least the ELPS and the LED.

13 Claims, 12 Drawing Sheets

(56) References Cited

U.S. PATENT DOCUMENTS

| | | | |
|---|---|---|---|
| 6,960,885 B2 | 11/2005 | Kim et al. | |
| 7,148,470 B2 | 12/2006 | Rains, Jr. et al. | |
| 7,564,190 B2 * | 7/2009 | Takahashi | 315/39 |
| 8,304,994 B2 | 11/2012 | Duelli | |
| 2005/0265024 A1 * | 12/2005 | Luk | 362/231 |
| 2007/0268700 A1 * | 11/2007 | Hough | 362/268 |
| 2008/0062692 A1 * | 3/2008 | Andersen et al. | 362/275 |

FOREIGN PATENT DOCUMENTS

| | | | |
|---|---|---|---|
| CN | 1411031 A | | 4/2003 |
| CN | 1471646 A | | 1/2004 |
| CN | 200943828 Y | | 9/2007 |
| EP | 1 898 145 A1 | | 3/2008 |
| WO | 02/43108 A2 | | 5/2002 |
| WO | 2005/094378 A2 | | 10/2005 |
| WO | 2007/079496 A2 | | 7/2007 |

OTHER PUBLICATIONS

Dielectric Mirror, Wikipedia, Two Pages.

Chinese Second Office Action and English Translation of Chinese Second Office Action Issuing Date May 30, 2013 of CN Application No. 200980134093.4 Corresponding to the Present Application.

* cited by examiner

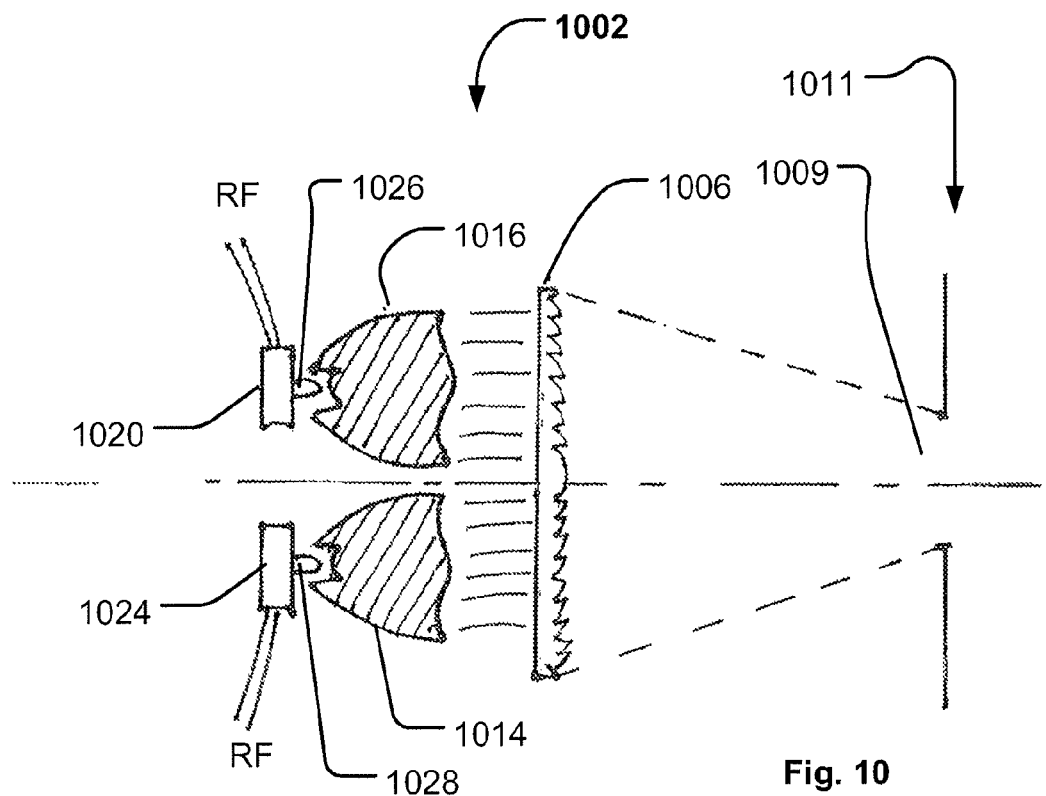
Fig. 10
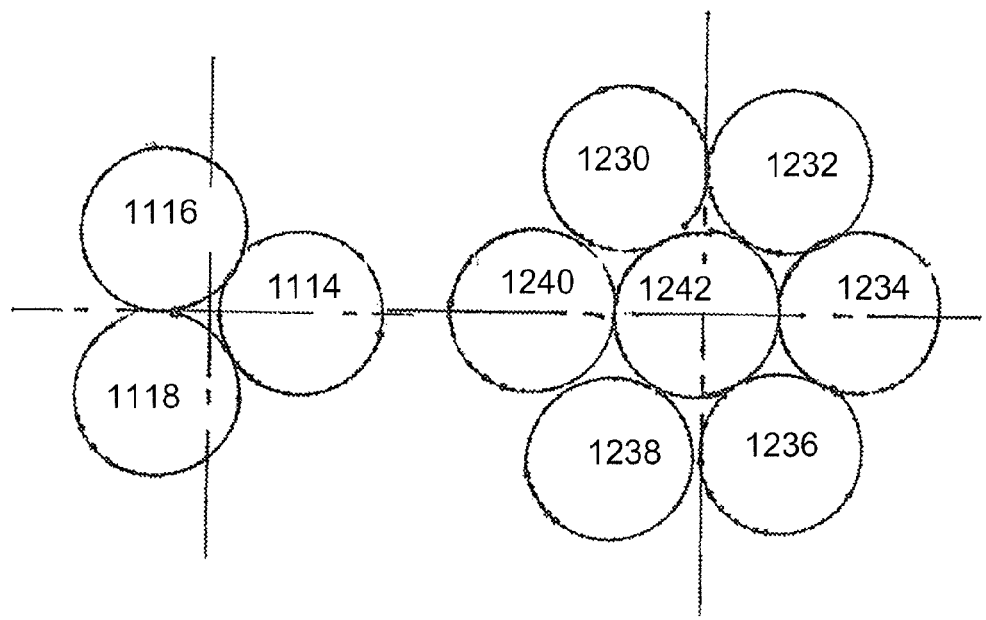
Fig. 11
Fig. 12

LIGHT FIXTURE WITH AN ELECTRODELESS PLASMA SOURCE

FIELD OF THE INVENTION

The present invention relates to a light fixture with an electrodeless plasma source and to moving heads and video projectors having such light fixture.

BACKGROUND OF THE INVENTION

U.S. Pat. No. 6,737,809 concerns a dielectric waveguide integrated plasma lamp (DWIPL) with a body consisting essentially of at least one dielectric material having a dielectric constant greater than approximately 2, and having a shape and dimensions such that the body resonates in at least one resonant mode when microwave energy of an appropriate frequency is coupled into the body. A bulb positioned in a cavity within the body contains a gas-fill which when receiving energy from the resonating body fauns a light-emitting plasma.

WO 2007/079496 concerns an electrode less plasma lamp comprising a lamp body including a solid dielectric material. The lamp includes a bulb received at least partially within an opening in the solid dielectric material and a radio frequency (RF) feed configured to provide power to the solid dielectric material. A conductive material is provided adjacent to the bulb to concentrate the power proximate the bulb. The conductive material may be located below an upper surface of the solid dielectric material. The conductive material may modify at least a portion of an electric field proximate the bulb so that the portion of the electric field is oriented substantially parallel to an upper surface of the lamp body.

There are several issuers related to the prior art electrodeless plasma sources (ELPS) such as those disclosed in U.S. Pat. No. 6,737,809 and WO 2007/079496. The ELSP bulb is positioned in an ELSPS resonator and the gas-fill inside the ELPS bulbs are exited by electromagnetic radiation in the microwave frequency. Some of the electromagnetic radiation used to excite the gas-fill, escapes the resonator which in many cases is unwanted electromagnetic interference with the surroundings. The electromagnetic radiations will especially escape through the ELSP bulb together with the light. Another issue is the fact that the ELPS bulb tends to flicker and changes it optical spectrum if not cooled properly. The lift time of the electrodeless plasma source is further shortened if the bulb is not sufficiently cooled. Yet another issue is the fact that the color temperature of the light from the ELPS tends to drift when the ELSP is dimmed. The ELPS is as a consequence very difficult to integrate in to complex optical systems like the ones used in entertainment lighting, such as moving heads and scanners, and in video projection systems.

DESCRIPTION OF THE INVENTION

The scope of the present invention is to solve the above described problems and can be fulfilled by a device of the initially mentioned type if the TIR lens comprises a metal grid covering at least a part of the TIR lens and where the metal grid is grounding electromagnetic radiation generated by said electrodeless plasma source.

It is hereby achieved that the electromagnetic radiation used to excite the gas-fill that escapes the ELSPS resonator can be absorbed and grounded by the metal grid and the light fixture can thus be used in entertainment lighting, conventional lighting and/or video projectors without causing electromagnetic interference with the surroundings. The skilled person realizes that the metal grid can be designed in many different ways as the main purpose of the metal grid is to absorb and ground electromagnetic radiation emitted by the resonator. The metal grid can e.g. be embodied as metal screens, metal coatings or a lattice of metal wires/bars.

The metal grid covers in one embodiment at least a part of the light output surface of the TIR lens and can be embodied as a lattice of metal wires/bars absorbing the electromagnet radiation form the ELSP resonator and at the same time allowing optical light to pass. A very efficient attenuation of the electromagnetic radiation along the optical axis is thus achieved with only a very small loss of light.

The metal grid can cover at least a part of a TIR surface of said TIR lens and can be embodied as a metal shield. The TIR surface of the TIR lens reflects the light. The metal sheet will thus attenuate the electromagnetic radiation from the ELSP resonator and not block the light as the light is reflected before hitting the metal sheet.

The light fixture comprises in another embodiment blowing means sending an air stream into the cavity of the TIR Lens. The ELPS bulb is hereby cooled very efficiently and the issues related to flickering and shift in optical spectra are avoided. The TIR lens comprises in another embodiment at least one air channel connecting the cavity and the outside of the TIR lens and the blowing means sends said air stream through the air channel. The TIR lens can as a consequence be positioned very closely to the ELPS bulb and most of the light is collected by the TIR lens. The air channel can comprise a number of tubes whereby the blowing means can send cooling air directly into the cavity of the TIR lens and also lead the heated cooling air outside of a housing. By directing air directly towards the bulb, it is possible to achieve a very turbulent flow around the bulb and thereby achieve a highly effective cooling. The turbulent air could be performed by at least one tube which could comprise ducts with small openings for generating a high speed air stream directed towards the bulb. These high-speed airstreams could come from different directions. In order to generate the most turbulent air just around the bulb, where the heating from the bulb automatically starts a convection transport of air away from the bulb itself The air streams can be directed towards the ELPS bulb from at least one direction for generating a turbulent flow around the ELPS bulb. By cooling from different directions, the cooling can be much more effective.

The present invention further relates to a moving head light fixture having a base is connected to a yoke that rotates in relation to the base in which a moving head with a light source is supported, where the light source further comprises at least one LED, which ELPS bulb and the LED are controlled by a first control system, which first control system performs dimmer control of at least the ELPS and the LED.

Hereby it can be achieved that in case of changes in the color temperature of the ELPS bulb it can be compensated by adjusting the color temperature that is resulting from the LED's so that the end color temperature leaving the combined light source is adjusted to achieve a mostly constant color temperature of the resulting light, which is for use in the projector or light fixture as such. This is rather important because dimming an ELPS bulb which is possible by reducing the power from 100 to 20 percent, an effective dimming can take place but the color temperature is by the dimming changed in the direction towards blue. The ELPS bulb can during a period of operation change the color temperature in the direction of blue. The correction for the change towards the blue color is performed by a number LEDs which then can pull the total color output back into the direction of the white light. Maybe it is the color that has to be produced and not white, but also in that situation manipulation of the LEDs can pull the color output in different directions and some colors can be generated. By compensating for the color change in the ELPS bulb, it is possible to use ELPS bulbs as light source in moving head lighting fixtures where the starting point is that you have a well-defined color from the light source. Also in projectors, e.g. for generating wide screen video pictures, it is important that the color temperature of the light source is well-known. As dimming is very easy, there is of course a high need for the described color manipulation.

The light direction means can be fainted by one ore more TIR (Total Internal Reflective) lens, which TIR lens are formed of a heat resistive material. The TIR lens is an alternative to using a reflector. Because a ELPS bulb as well as LEDs are transmitting most of their lights forwards from a relative small volume, a TIR lens which is taken up most of the generated light can accommodate most of the light and change the direction of the light into a light beam of mostly parallel light. Because it is a TIR lens, the reflections in this lens are performed with nearly no loss of power.

A number of ELPS bulbs can be operating in parallel, the light from each ELPS bulb is collimated by optics, which could be TIR lenses, reflectors, CPC's or tapered light pipes, which light from a number of collimating optics can be combined in a common fresnel lens, which fresnel lens deviates the light into a focus area, in which focus area a gobo is placed. It is possible to use a number of ELPS bulbs in parallel in combination with a number of LEDs and placing collimating optics above each of the single light sources can collect most of the generated light and form this light into the direction of the common fresnel lens. By using the fresnel lens, the light generated from the number of light sources are mixed so much that when the light is concentrated, e.g. in a focus area for a gobos, it is mostly homogeneous light that is used for the gobos.

The light path in the light fixture can be folded at least once, which light path starting at the light source and passing through internal optical components, which light path is leaving the light fixture through the front lens, in which light fixture the light path is folded by at least one optical reflector. By folding the light path a much shorter projector or light fixture can be achieved. A further bonus by using the ELPS bulb in the folded projector or light fixture is achieved in that high frequency radiation generated at the ELPS is transmitted in the same direction as the light. By performing a folding by an optical reflector, this reflector can be made in a way in which there a no reflections of the electromagnetic energy.

DESCRIPTION OF THE DRAWING

FIG. 10 shows an alternative embodiment to FIG. 9;

FIG. 11 shows the front end of three times collimating optics;

FIG. 12 shows more or less the same invention as FIG. 11, but now the numbers of collimating optics indicated are increased to seven;

DETAILED DESCRIPTION OF THE INVENTION

Figure 1:
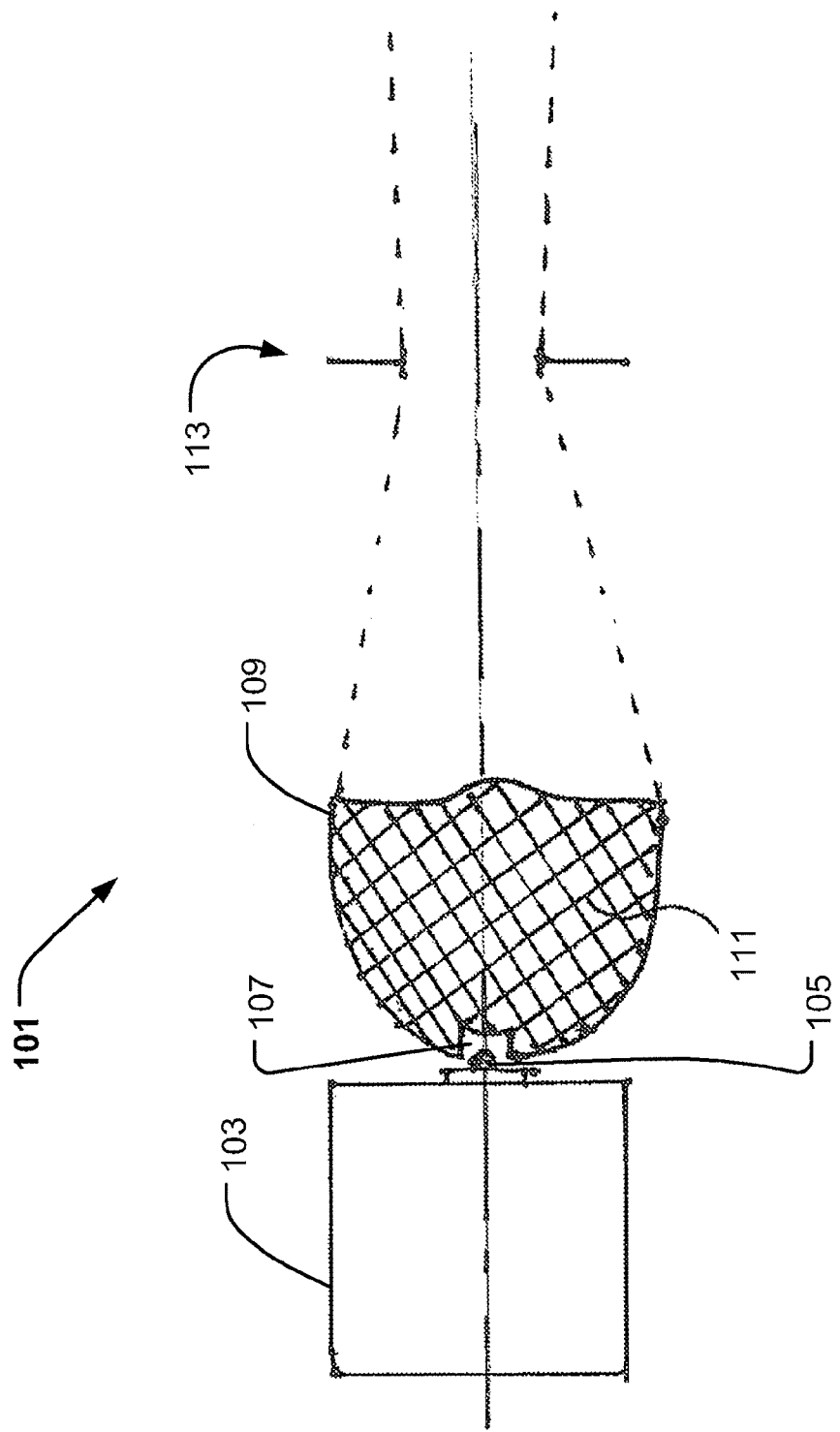
FIG. 1 illustrates side view of a light fixture according to the present invention.

FIG. 1 shows a first embodiment of the invention where the inner components of a light fixture or projector 101 shows an ELPS resonator 103 and an ELPS light bulb 105 which ELPS bulb 105 is operating inside a cavity 107 in a TIR lens 109. This TIR lens 109 is at the outside covered with a metal grid 111 for grounding electromagnetic radiation generated from the ELPS generator 103. The TIR lens 109 is formed so that it automatically concentrates the light in a gobo plane 113.

Figure 2:
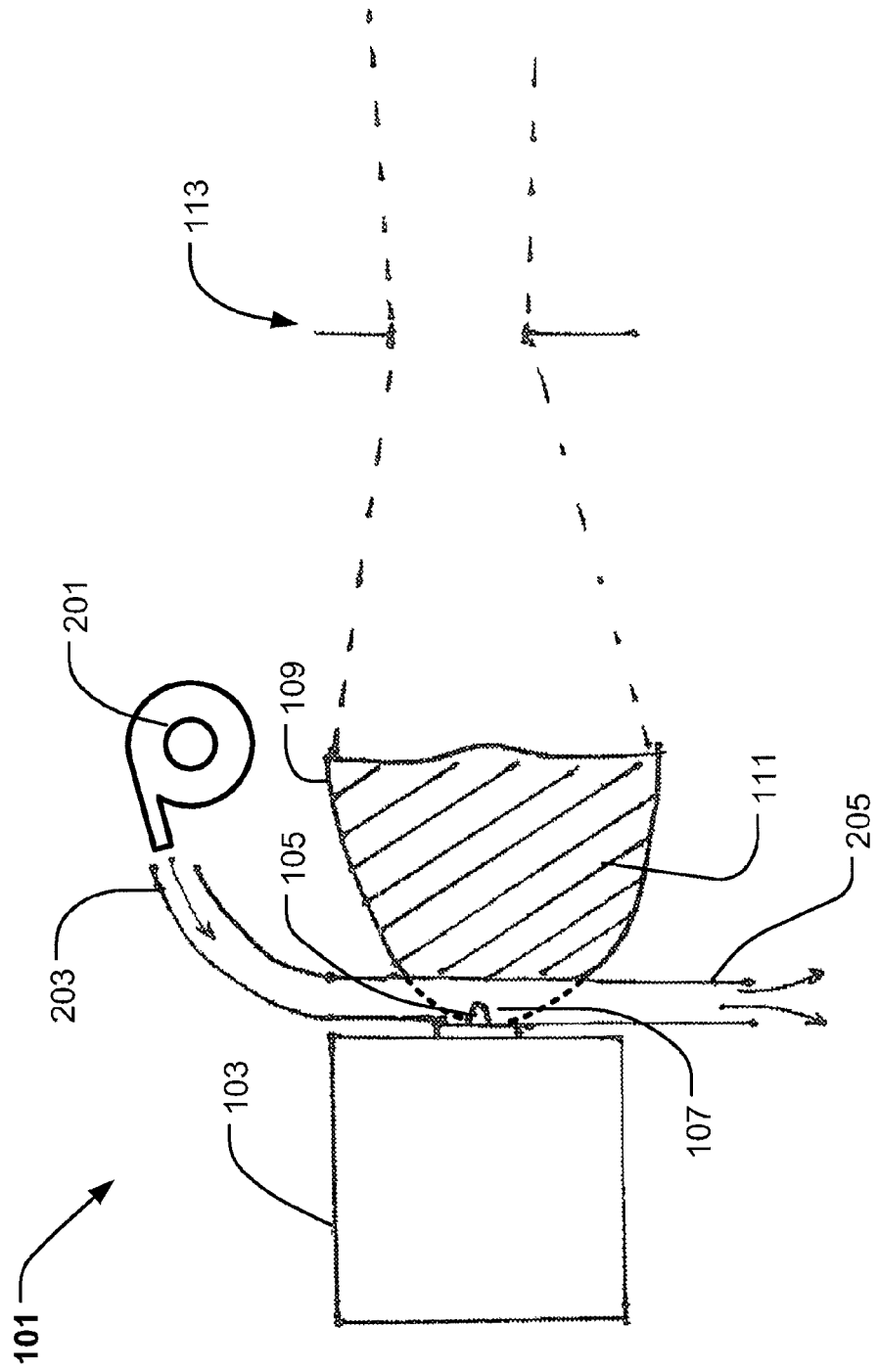
FIG. 2 illustrates side view of a light fixture according to the present invention with a cooling system.

FIG. 2 shows the same embodiment as in FIG. 1, but now a cooling system is added where blowing means 201 are sending an air stream through a tube 203 into a partly cavity 107 in the TIR lens 109, so a powerful air stream is passing just around the ELPS bulb 105 for cooling. Air, which is leaving the cavity is leaving through a tube 205 and it could be led outside the housing of the light fixture or projector.

Figure 3:
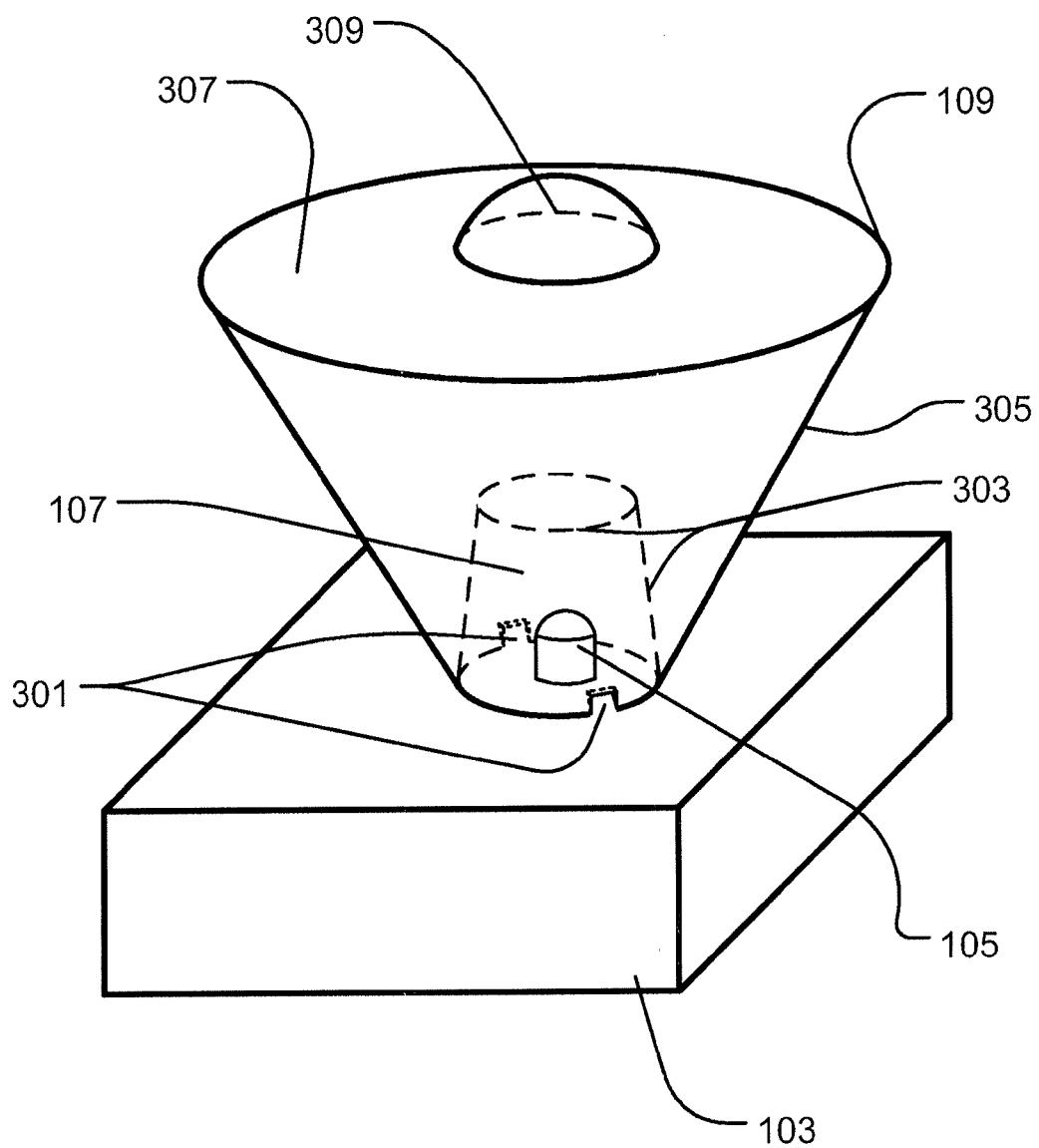
FIG. 3 illustrates a perspective view of a light fixture according to the present invention where the TIR lens comprises air channels.

FIG. 3 illustrates a perspective view of an embodiment of the present invention where the TIR lens comprises at least one air channel 301 connecting the cavity 107 and the outside of the TIR lens. The blowing means (not shown for simplicity) sends said air stream into the cavity 107 where the air stream cools the ELPS bulb. The air channel is in the illustrated embodiment embodied as a cut-out and the skilled person realizes that the cut-out can have any shape and size. The cut-out can e.g. be drilled or milled in the TIR lens and could also be constructed while moulding the TIR lens. The TIR lens comprises as known in the art of TIR lenses 109 an entrance surfaces 303, TIR surface 305 and an output surface 307. The light form the ELPS bulb 105 enters the TIR lens through the entrance surface which typically comprises the internal surfaces of the cavity 107. The light is thereafter reflected by the TIR surface 305 and exits through the output surface 307. Some light passes directly from the entrance surface to the output surface. The structure of the different surface of the TIR lens can be (by a person skilled in the art of optics) designed in order to fulfil different requirements. The output surface can e.g. have a curved portion 309 as illustrated. The air stream can in the illustrated embodiment be let into the cavity through one of the air channels 301 and be let out through the other air channel 301 and an air stream (not shown) will thus flow around the ELPS bulb 105 and provide cooling of the ELPS bulb.

Figure 4:
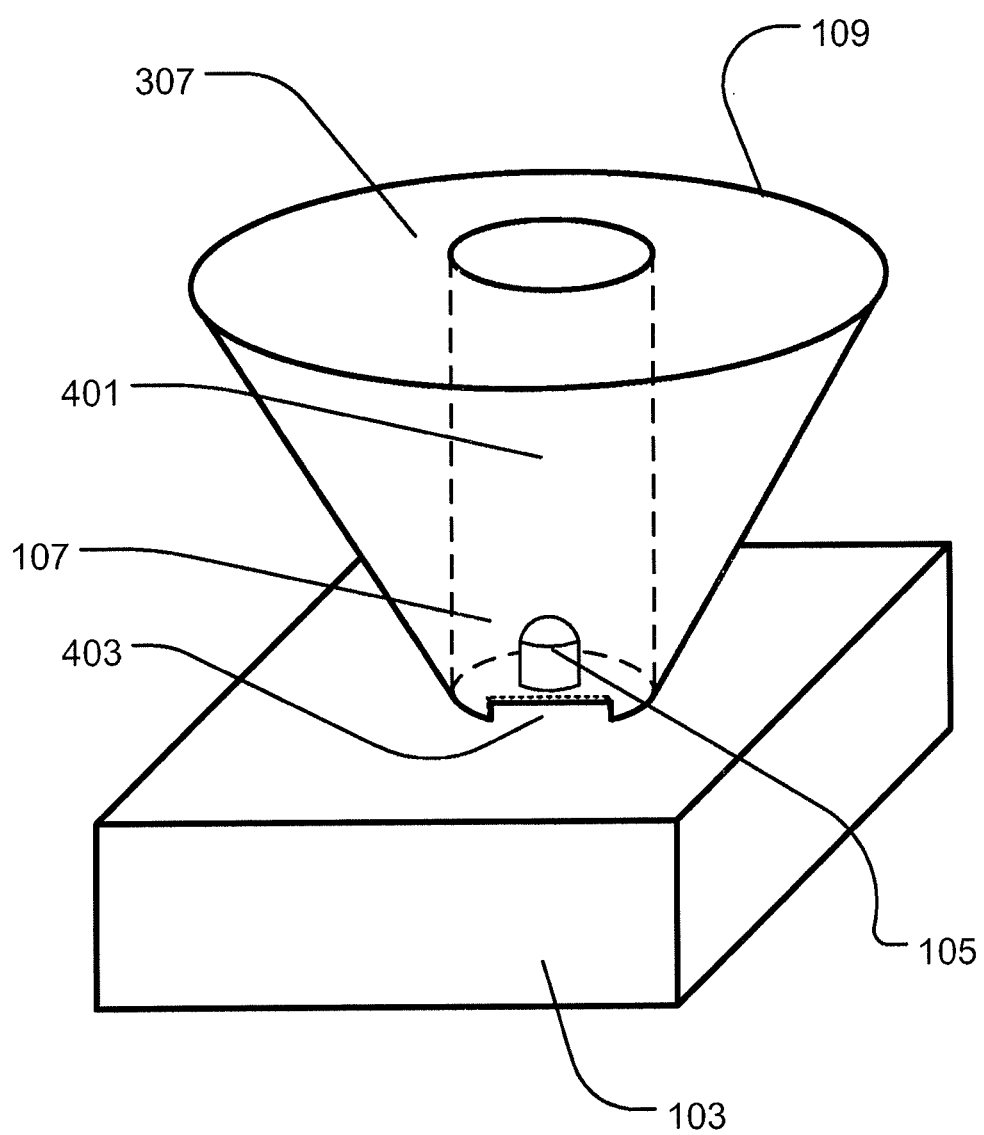
FIG. 4 illustrates a perspective view of a light fixture according to the present invention where the TIR lens comprises alternative air channels.

FIG. 4 illustrates a perspective view of an embodiment of the present invention where the air channel connecting the cavity 107 and the outside is embodied as a channel 401 going from the output surface 307 of the TIR lens to the cavity and as a slit 403 in the bottom of the TIR lens. Blowing means (not shown for simplicity) can thus send an air stream through the TIR lens and thereby cool the ELPS bulb 105. Such air stream can convey air in both ways through the TIR lens.

Figure 5:
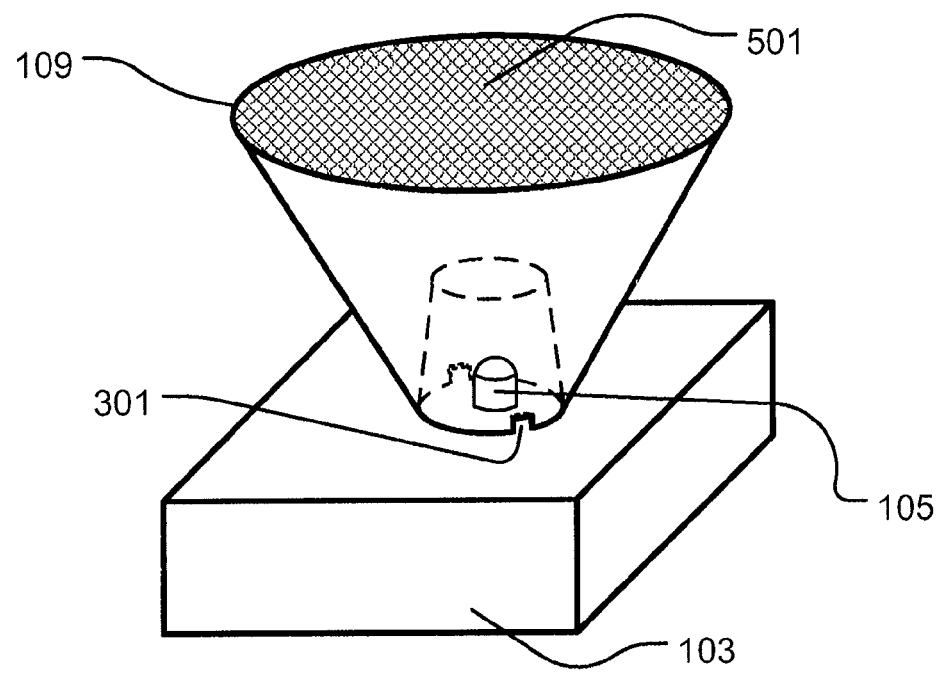
FIG. 5 illustrates a perspective view of a light fixture according to the present invention where the output surface of the TIR lens comprises a metal grid.
Figure 6:
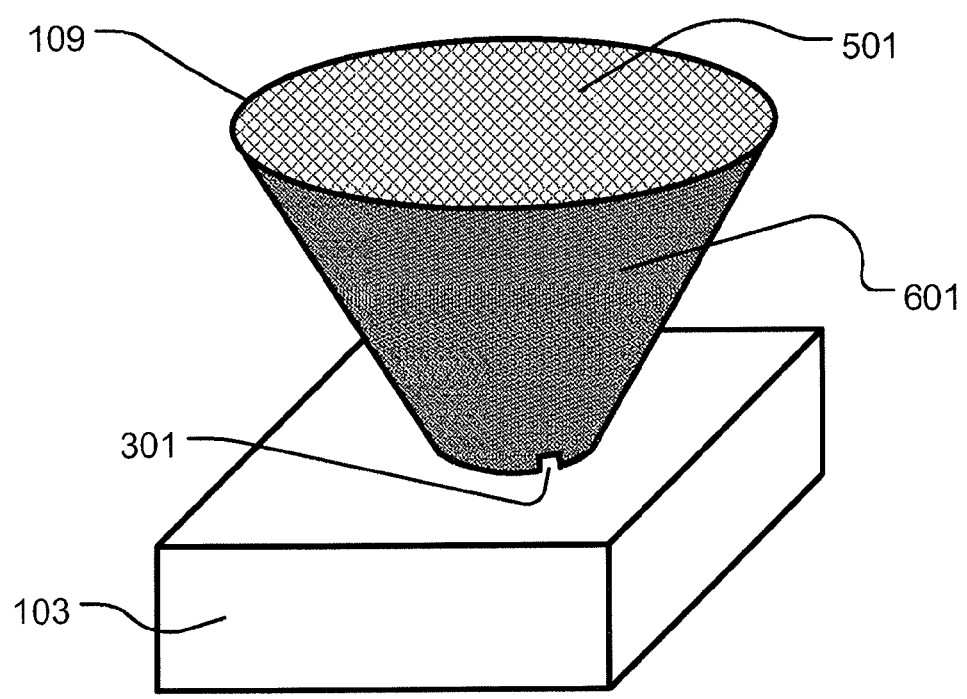
FIG. 6 illustrates a perspective view of a light fixture according to the present invention where the TIR surface of the TIR lens comprises a metal grid.

FIGS. 5 and 6 illustrate a perspective view a light fixture according to the present invention. The light fixture comprises an electrodeless plasma source comprising a resonator 103 and an ELPS light bulb 105. The ELSP bulb is operating inside a cavity 107 of a TIR lens as described above. The TIR lens comprises a metal grid covering at least a part of said TIR lens. The metal grid is grounding electromagnetic radiation generated by said electrodeless plasma source. The skilled person realizes that the metal grid can be designed in many different ways, as the main purpose of the metal grid is to absorb and ground electromagnetic radiation emitted by the resonator. The metal grid can e.g. be embodied as metal screens, metal coatings or a lattice of metal wires/bars. The light fixture in FIG. 5 illustrates an embodiment where the metal grid is embodied as a lattice of wires 501 covering the output surface of the TIR lens. The lattice of wires absorbs electromagnetic radiation emitted by the resonator and does at the same time let most of the light pass through the lattice. It is hereby achieved that the unwanted electromagnetic radiation from the resonator is attenuated and that light at the same time is let out of the output surface of the TIR lens. FIG. 6 illustrates an embodiment where the TIR surface of the TIR lens is coated by a metal coating whereby electromagnetic radiation from the radiator escaping through the TIR surface of the TIR lens is also attenuated.

Figure 7:
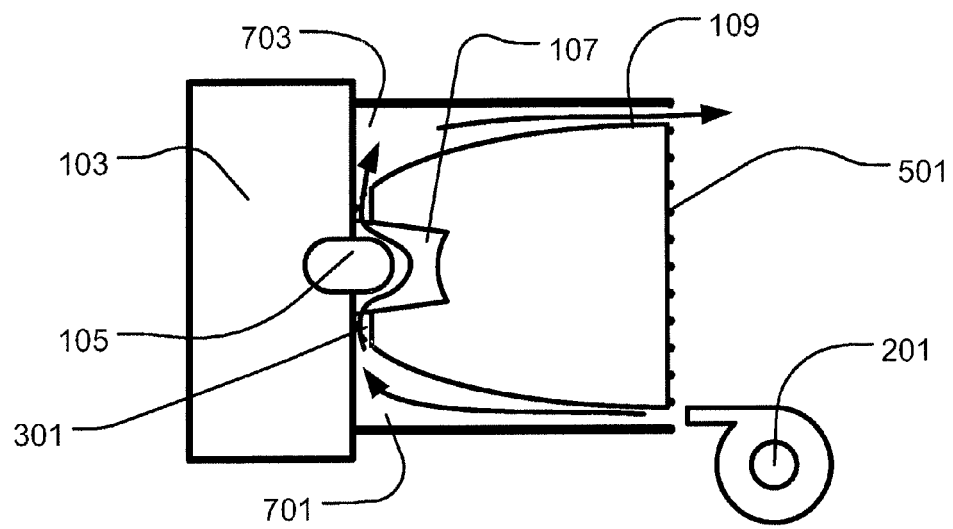
FIG. 7 illustrates a cross-section view of a light fixture according to the present invention and shows the air stream.
Figure 8:
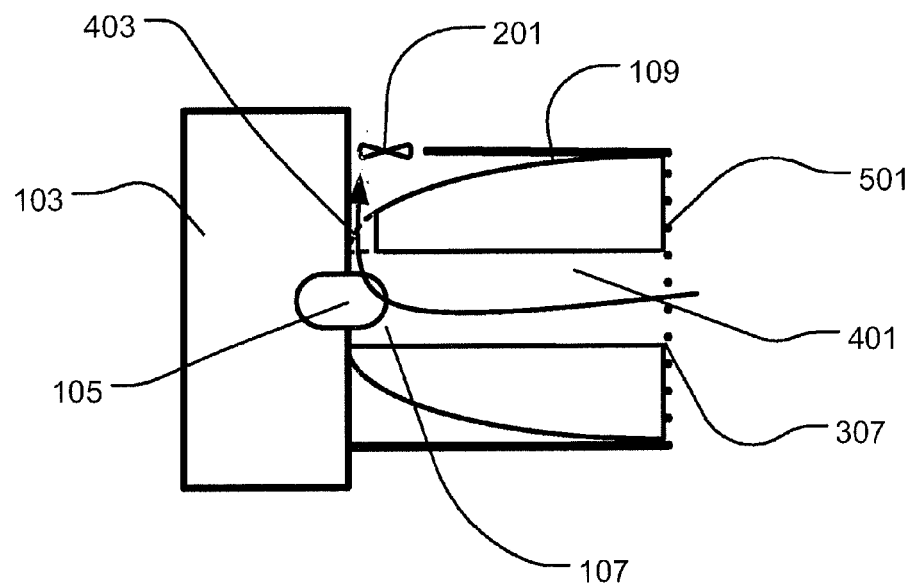
FIG. 8 illustrates a cross-section view of an alternative light fixture according to the present invention and shows the air stream.

FIGS. 7 and 8 illustrate cross-sectional views of the light fixture according to the present invention where the metal grid covering a part of the TIR surface is embodied as a metal screen 701 surrounding the TIR lens 109. The output surface of the TIR lens is covered by a metal lattice 501. FIG. 7 illustrates a light fixture with a TIR lens like the TIR lens shown in FIG. 3. In this embodiment, the blowing means 201 are adapted to let air into a cavity 701 between the metal screen an the TIR lens from where the air stream flows into the cavity of the TIR lens 107 through air channel 301 and out of the cavity 703 at the other side of the TIR lens as indicated by the arrows. Cavity 701 and 703 are separated by a wall (not shown) such that air is forced to flow through the air to flow the air channel 301 and the cavity of the TIR lens 107.

FIG. 8 illustrates a light fixture with a TIR lens like the one shown in FIG. 4. The blowing means are in this embodiment positioned in an opening in the metal screen 701 and adapted to suck air through the air channel 401 going from the output surface 307 of the TIR lens to the cavity 107 and through the slit 403 in the bottom of the TIR lens. The blowing means can also lead the air the opposite way.

Figure 9:
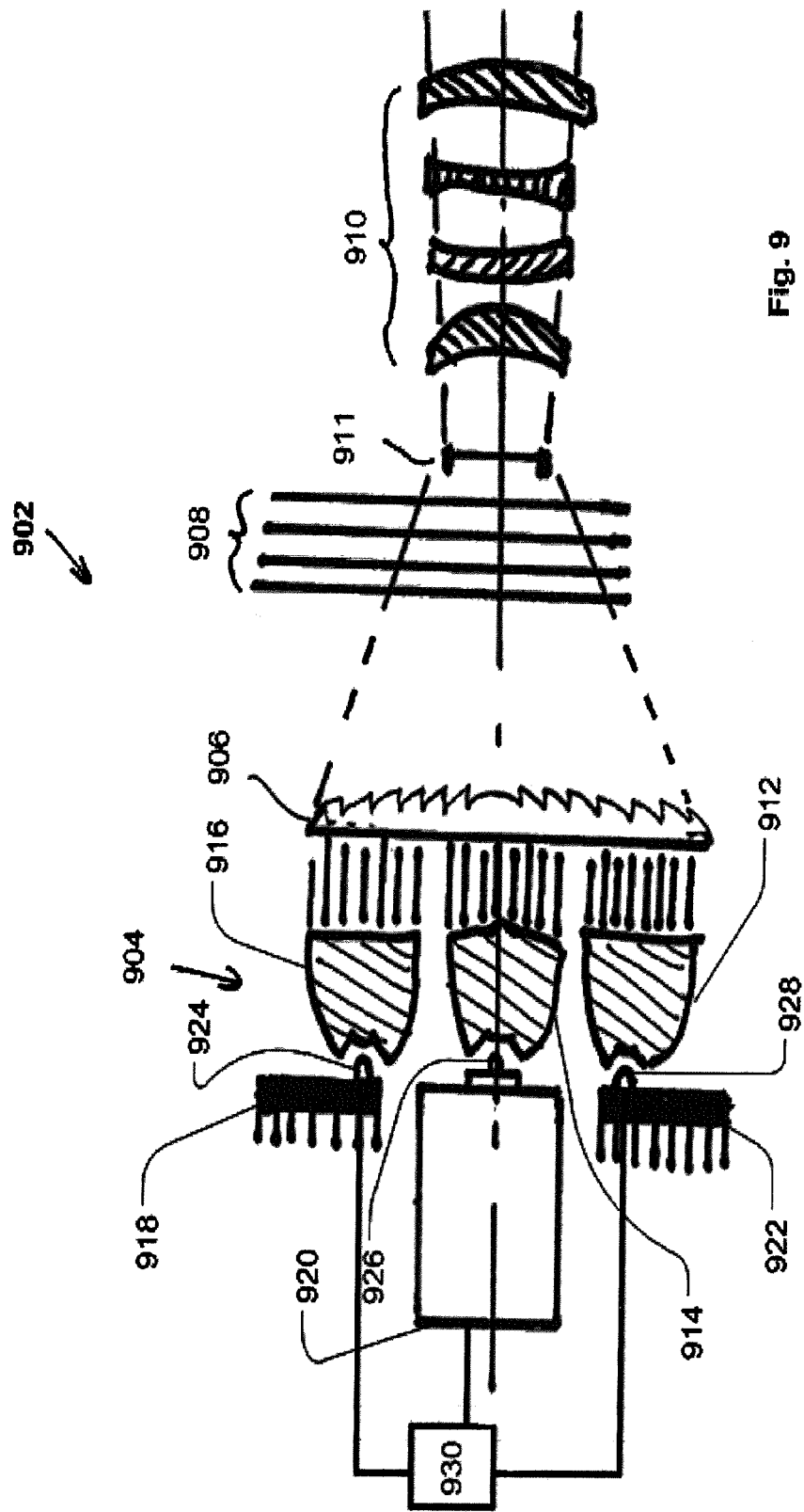
FIG. 9 illustrates a side view of a light fixture according to another aspect of the present invention.

FIG. 9 shows a first possible embodiment for a light fixture or a projector 902 according to another aspect of the present invention. The light fixture comprises light sources 904, a fresnel lens 906, a number of color filters 908, and a lens system 910. Light from each source is collimated by collimating optics 912, 914, 916 the collimated light is then combined and concentrated by use of a Fresnel lens 906. Light is generated by electronic circuits 918 which is driving one or more LEDs 924 and with a ELPS resonance circuit 920 driving a ELPS bulb 926 and further an electric circuit 922 driving at least one LED 928.

In operation, the ELPS bulb 926 will operate as the main light source. In normal operation with full power delivered to the ELPS resonator 920, the ELPS bulb 926 can deliver nearly perfect white light. This light is then by help of the collimating optics 912, 914, 916 and the fresnel lens 906 mixed and concentrated on its way through the color filters 908. It is possible to use CMY flags as color filters. These color filters can be moved in and out of the light and if the input is white light nearly every possible colors can be generated. The light generated by a combination of at least one ELPS bulb and at least one LED can thus be modified by at least one color filter. The optical filter can comprise color converting properties. The light generated by a combination of at least one ELPS bulb and at least one LED can be modified by at least one color filter. Further color manipulation is possible, e.g. in a light fixture by using traditionally well-known color filters. Correct use of these color filters renders it possible to achieve most of the total color spectrum. But it is necessary by filtration to know the color temperature of the light generated from the light source.

The light generated by a combination of at least one ELPS bulb and at least one LED can be modified by at least one optical filter, which optical filter comprises color converting properties. By using an optical filter with color converting properties such as e.g. a phosphor layer placed at the filter surface, it is possible to generate different colors. By using phosphor for color change, it is possible to let the ELPS bulb and the LED operate in the ultra violet spectrum. Then the light of the different colors are generated by using different active color filters for generating different colors.

The light can be concentrated in a gobo plane 911 before the light is further projected by the lens system 910. This lens system 910 could comprise a zoom lens so there could be performed a zoom of the output light beam.

In a situation where a dimming is performed of the ELPS resonance circuit 920 and the light produced from the ELPS bulb 926 is being reduced, a change of color occurs of the generated light in the direction of more blue light. In order to compensate for the generated blue light, the LEDs 924 and 928 can be switched on. Depending on which color that is delivered from the LEDs, compensation can be performed so that the total result of light is being continued as white light so there is no influence for the output light that is generated. It is to be understood that the LEDs 924 and 928 can be a combination of LEDs which by software control by itself can generate light at nearly every possible color. Therefore, if a software routine knows the change of the light in the ELPS bulb 926 and automatic compensation can be performed by controlling the color output of the LEDs 924 and 928. As shown in FIG. 9, a first control system 930 can be provided by which color correction of at least the ELPS and the LED can be performed FIG. 10 shows an alternative embodiment to FIG. 9 where the light fixture 1002 comprises a fresnel lens 1006 and a gate opening 1008 in a gobo plane 1011 where collimating optics 1014 and 1016 are collimating light generated by ELPS light bulbs 1026 and 1028. The ELPS light bulb 1026 is operated by a first ELPS resonator 1020 and where the light bulb 1028 is operated by an ELPS resonator 1024.

In operation, two different light sources are being combined by the fresnel lens 1006 for delivering light in a gobo plane 1008.

FIG. 11 shows the front end of three collimating optics which could be TIR lenses 1114, 1116 and 1118, which collimating optics are operating as a common light source. By using three different ELPS generators it should be possible to form three different colors and form white light by a combination of light sources and to form light at different colors by dimming one or more of the ELPS resonators. Further 3 identical white sources could be combined into a more intense light source.

FIG. 12 shows more or less the same invention as FIG. 3, but now the numbers of collimating optics which could be TIR lenses indicated are increased to seven which are 1230, 1232, 1234, 1236, 1238, 1240 and 1242. Combining seven or even more ELPS generators and with their light generating bulbs, it is possible to generate a very intensive beam of light.

Combining a number of ELPS light sources gives the possibility of increasing the light output in a light fixture up to a very high power level. Using more than three different colors also render possible that a color adjustment can be performed where nearly all colors can be achieved. Further some sources can be used as redundancy, decreasing failure rate or prolonging service life of a fixture.

Figure 13:
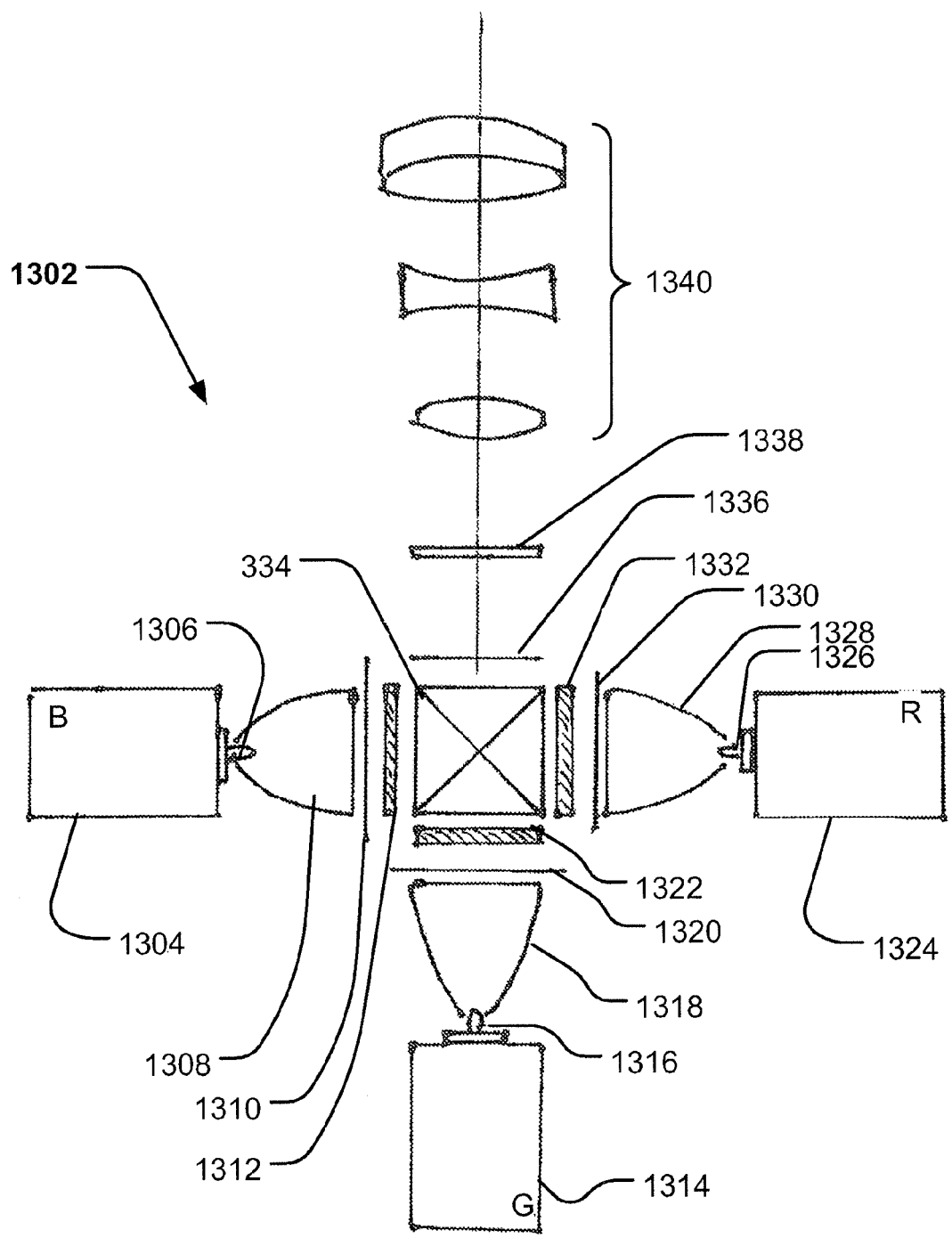
FIG. 13 shows the inner structure of a projector.

FIG. 13 shows the inner structure of a projector 1302, the projector 1302 comprises a first ELPS resonator 1304 which is operating the light generating bulb 1306, which light bulb 1306 could be generating a blue color. This light is then collected into a parabolic reflector or a TIR lens 1308 and from there the light passes a polarization filter 1310 before the light passes a liquid crystal display 1312. Further is indicated an ELPS resonator 1314 which is operating a bulb 1316, probably operating in the green color. Light is collected in a parabolic reflector or into a TIR lens 1318 where the light is concentrated and passing through a polarization filter 1320 before the ELPS is passing through a liquid crystal display 1322. Further is shown a third ELPS resonator 1324. Further is shown a third ELPS resonator 1324 which is operating a light bulb 1326 probably in the red color. The light is collected in a parabolic reflector or into a TIR lens 1328 before the light is sent to a polarization filter 1330. Further is indicated one liquid crystal display 1332. Light coming from 3 different directions are combined in a color cube 1334 into a common beam of light. This beam of light is then sent through a number of different filters 1336 and 1338 and further through a lens system 1340.

In operation of a projector as shown in FIG. 13, it is possible to form a video projector. This video projector can be extremely powerful because the ELPS resonators together with the bulbs are generating a very powerful light. A very effective cooling is necessary at the liquid crystal displays 1312, 1322 and 1332. Each time one of these displays are changed into black, all the power generated of the ELPS generator and the bulb will be concentrated in the dark parts of the liquid crystal display. Further, the polarization filters 1310, 1320 and 1330 need to be cooled because they are probably collecting up to 50 percent of the light generated.

A video projector could instead be performed by digital mirrors because digital mirrors are probably better to overcome the intensive heat.

Figure 14:
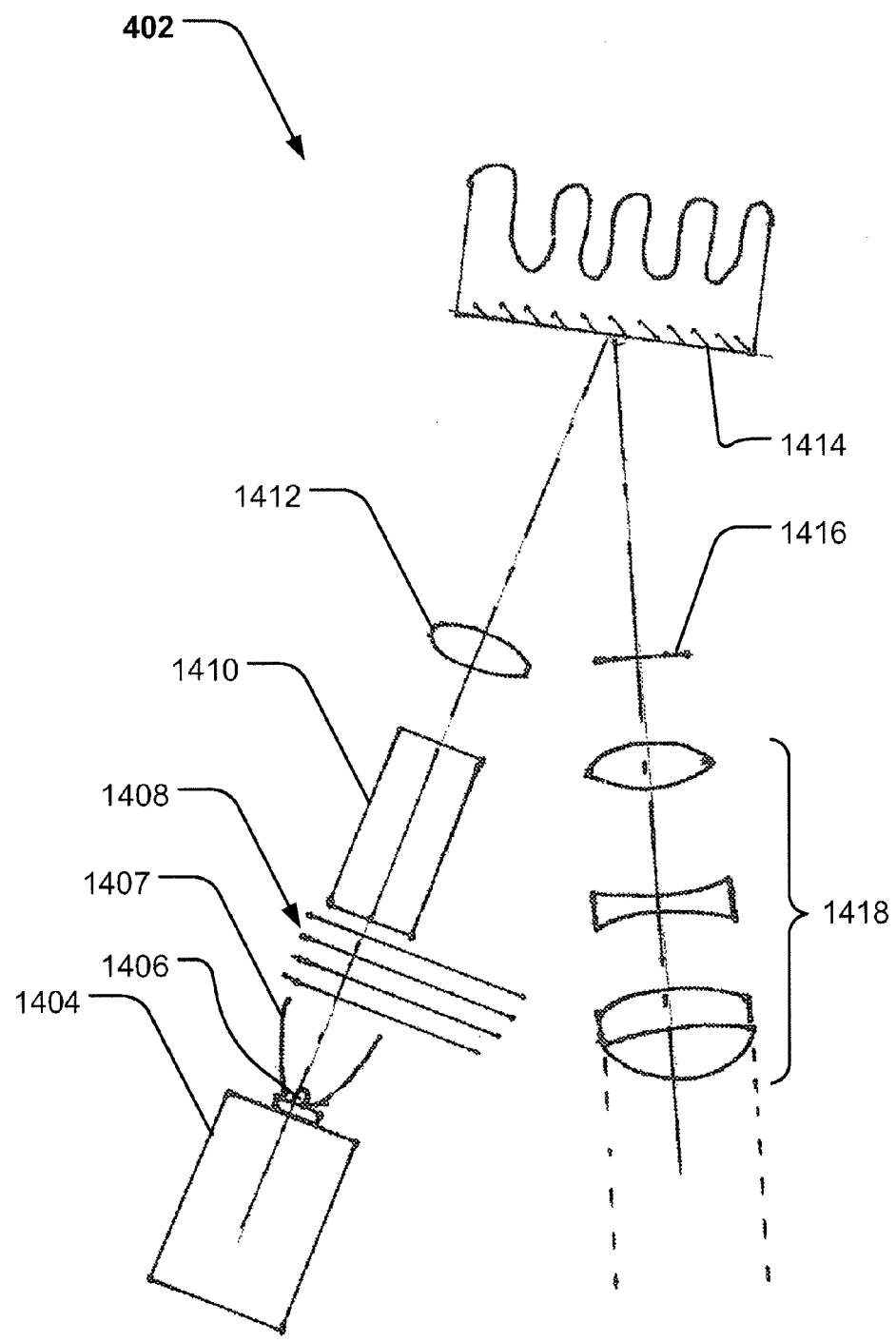
FIG. 14 shows the inner structure of a folded projector.

FIG. 14 shows the inner structure of a folded projector 1402 comprising an ELPS generator 1404 operating with an ELPS bulb 1406. This ELPS bulb 1406 is operated inside a parabolic reflector 1407. Just after the parabolic reflector color filters 1408 are shown. The light is continued into a light pipe 1410 before it passes through a lens 1412. The light is reflected by a mirror 1414 before the light passes through further a filter 1416 which could be in the gobo plane and the light is leaving the projector through a lens system 1418.

The reflector mirror 1414 could be made in a way in which it is reflecting only visible light but is absorbing microwave, IR and UV energy that might be delivered from the ELPS generator 1404 in the same direction as the beam of light. By reflecting the beam of light and absorbing the microwave energy it is avoided that there is a content of microwave energy in the light that is leaving the light fixture or projector.

Figure 15:
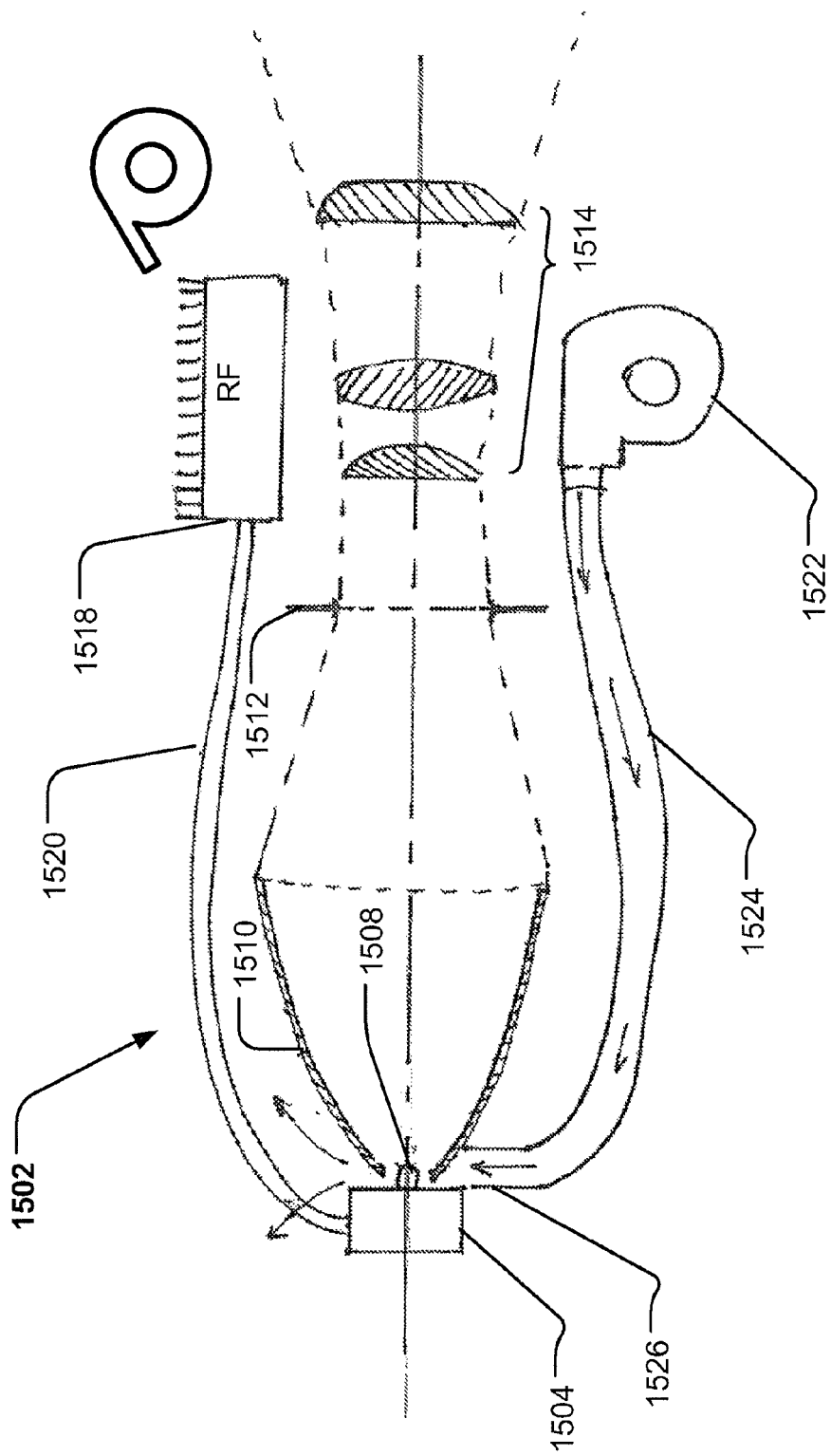
FIG. 15 shows further an embodiment for a possible invention used in a light fixture or in a projector.

FIG. 15 shows further an embodiment for a possible invention used in a light fixture or in a projector. The system 1502 relates to a part of a ELPS generator 1504 which is generating light in a ELPS light bulb 1508. This ELPS light bulb 1508 is placed inside the reflector 1510. The light is concentrated in a gobo plane 1512 and the light is further projected by a lens system 1514. The ELPS generator is placed in the first part 1518 and connected to the second part by a wave guide 1520 which is connected from the ELPS resonator 1518 to the ELPS generator 1504. Further, is shown a blower 1512 which by a tube 1524 is sending cooling air through a duct 1526 towards the light generating bulb 1508.

In this way, two rather major components have been moved away from the light source and forwards in a light fixture or a reflector until a position in which there is much better room for the components. Here the first part of the radio frequency operated ELPS generator 1518 is placed which is connected by the wave guide 1520 to the second part of the resonator 1504. Hereby part of the power that has to be removed generated at a place where there is much better possibility for effective cooling. Furthermore, the blower 1524 can be placed somewhere in a housing where relative cool air occurs. Hereby, the total cooling efficiency is increased.

Figure 16A:
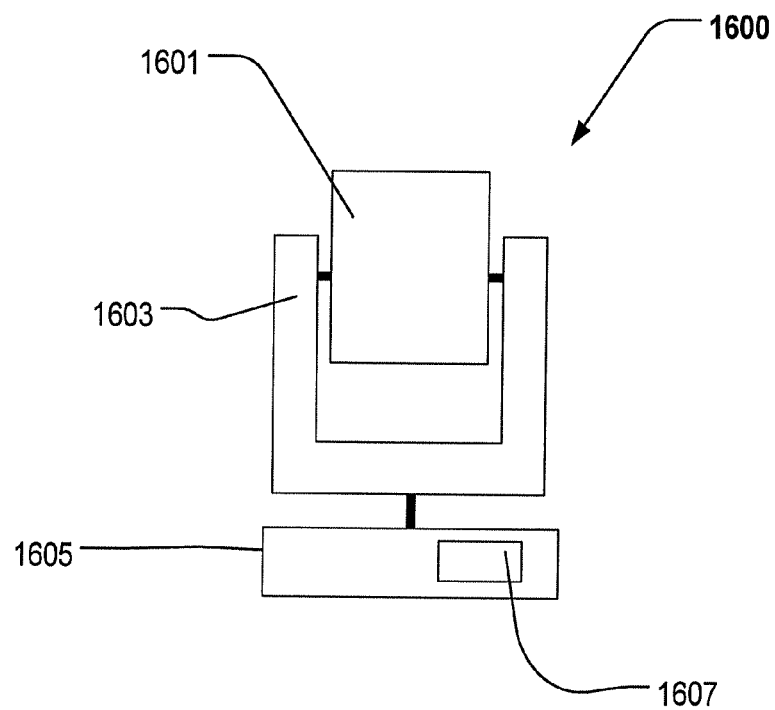
FIGS. 16*a* & 16*b* schematically depict, respectively, a front view and a side view of a moving head fixture.
Figure 16B:
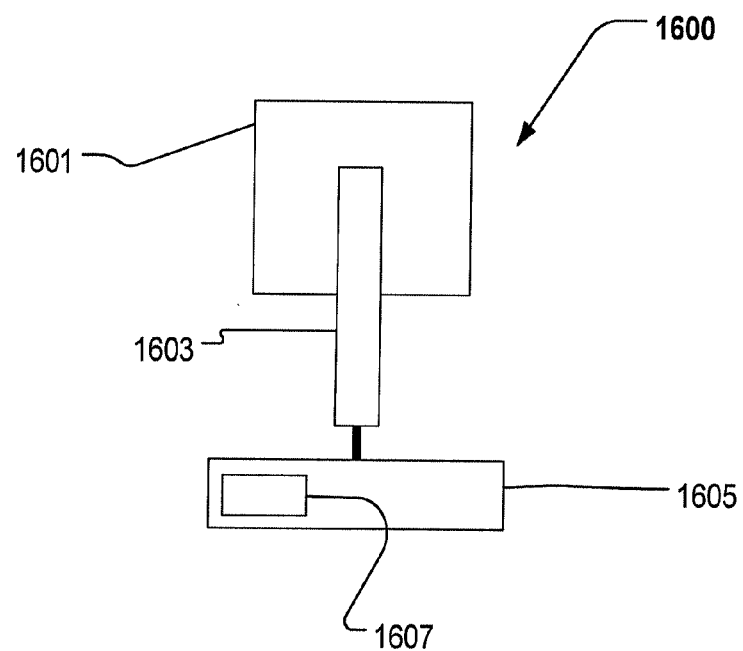

As shown in FIGS. 16*a* & 16*b*, the moving head light fixture 1600 comprises a base 1605, which base is connected to a yoke 1603, which yoke 1603 rotates in relation to the base 1605 around a first rotational center in the base 1605 and is connected to a head 1601. The head 1601 rotates in relation to the yoke 1603 around a second rotational center in the arms of the yoke 1603. The head 1601 contains the above described light source and the base contains a control system 1607 for the light source.

What is claimed is:

1. Light fixture comprising an electrodeless plasma source, said electrodeless plasma source comprises a resonator and a light bulb, said light bulb is operating inside a cavity of a TIR lens, wherein said TIR lens comprises an entrance surface, a TIR surface and an output surface, wherein said entrance surface comprises internal surfaces of said cavity and wherein said TIR lens comprises a metal grid covering at least a part of said TIR lens, said metal grid grounding electromagnetic radiation generated by said electrodeless plasma source.

2. Light fixture according to claim 1 characterized in that at least a part of said metal grid covers at least a part of said output surface of said TIR lens.

3. Light fixture according to claim 1 characterized in that at least a part of said metal grid covers at least a part of said TIR surface of said TIR lens.

4. Light fixture according to claim 1 characterized in that said light fixture further comprises blowing means sending an air stream into said cavity.

5. Light fixture according to claim 4 characterized in that said TIR lens comprises at least one air channel connecting said cavity and the outside of said TIR lens and in that said blowing means sends said air stream through said air channel.

6. Light fixture according to claim 5 characterized in that said air channel comprises at least one tube.

7. Light fixture according to claim 6 characterized in that said light fixture comprises a housing and in that at least a part of said air stream is being led outside said housing through at least one tube.

8. Light fixture comprising an electrodeless plasma source, said electrodeless plasma source comprises a resonator and a light bulb, said light bulb is operating inside a cavity of a TIR lens, where said TIR comprises an entrance surface, a TIR surface and an output surface, and wherein said entrance surface comprises the internal surfaces of said cavity and wherein said light fixture further comprises blowing means sending an air stream into said cavity.

9. Light fixture according to claim 8 characterized in that said TIR lens comprises at least one air channel connecting said cavity and the outside of said TIR lens and in that said blowing means sends said air stream through said air channel.

10. Light fixture according to claim 9 characterized in that said air channel comprises at least one tube.

11. Light fixture according to claim 10 characterized in that said light fixture comprises a housing and in that at least a part of said air stream is being led outside said housing through at least one tube.

12. Moving head light fixture, which moving head light fixture comprises a base, which base is connected to a yoke, which yoke rotates in relation to the base around a first rotational centre in the base, which yoke is connected to a head, which head rotates in relation to the yoke around a second rotational centre in arms of the yoke, characterized in that said head comprises a light fixture comprising an electrodeless plasma source, wherein said electrodeless plasma source comprises a resonator and a light bulb, said light bulb being located inside of a cavity of a TIR lens, wherein said TIR lens comprises an entrance surface, a TIR surface and an output surface, and wherein said entrance surface comprises internal surfaces of said cavity and wherein said TIR lens comprises a metal grid covering at least a part of said TIR lens, said metal grid grounding electromagnetic radiation generated by said electrodeless plasma source.

13. Light fixture comprising an electrodeless plasma source, said electrodeless plasma source comprises a resonator and a light bulb, said light bulb is operating inside a cavity of a TIR lens, wherein said TIR comprises an entrance surface, a TIR surface and an output surface, and where said entrance surface comprises the internal surfaces of said cavity and where light form said electrodeless plasma source enters the TIR lens through said entrance surface and where at least a part of said light is reflected by said surface and exits through said output surface and where at least a part of said light passes directly from the entrance surface to the output surface.

* * * * *